United States Patent [19]

Giannone

[11] 3,858,634
[45] Jan. 7, 1975

[54] TIRE CHAIN DEVICE
[76] Inventor: Victor S. Giannone, 952 Central Ave., Peekskill, N.Y. 10560
[22] Filed: Mar. 15, 1974
[21] Appl. No.: 451,386

[52] U.S. Cl.............. 152/213 A, 24/197, 152/241
[51] Int. Cl............................................ B60c 27/00
[58] Field of Search............ 152/213 R, 213 A, 217, 152/218, 219, 221, 223, 225–233, 239, 241, 242; 24/69 TT, 171, 196, 197, 245 C, 245 B, 245 R, 247

[56] References Cited
UNITED STATES PATENTS
1,292,298  1/1919  Fritsche................................ 24/196
2,820,502  1/1958  Spencer............................... 152/218
2,918,960  12/1959  McGuinness....................... 152/233

Primary Examiner—Robert B. Reeves
Assistant Examiner—Larry H. Martin
Attorney, Agent, or Firm—Robert G. McMorrow

[57] ABSTRACT

An improvement in an adjustable tire chain of the type having inboard and outboard adjustable straps with link chains extending between the straps at spaced intervals, in which the straps have butterfly plugs which serve to form the straps into rectilinear sections and to connect the straps to the chains.

4 Claims, 4 Drawing Figures

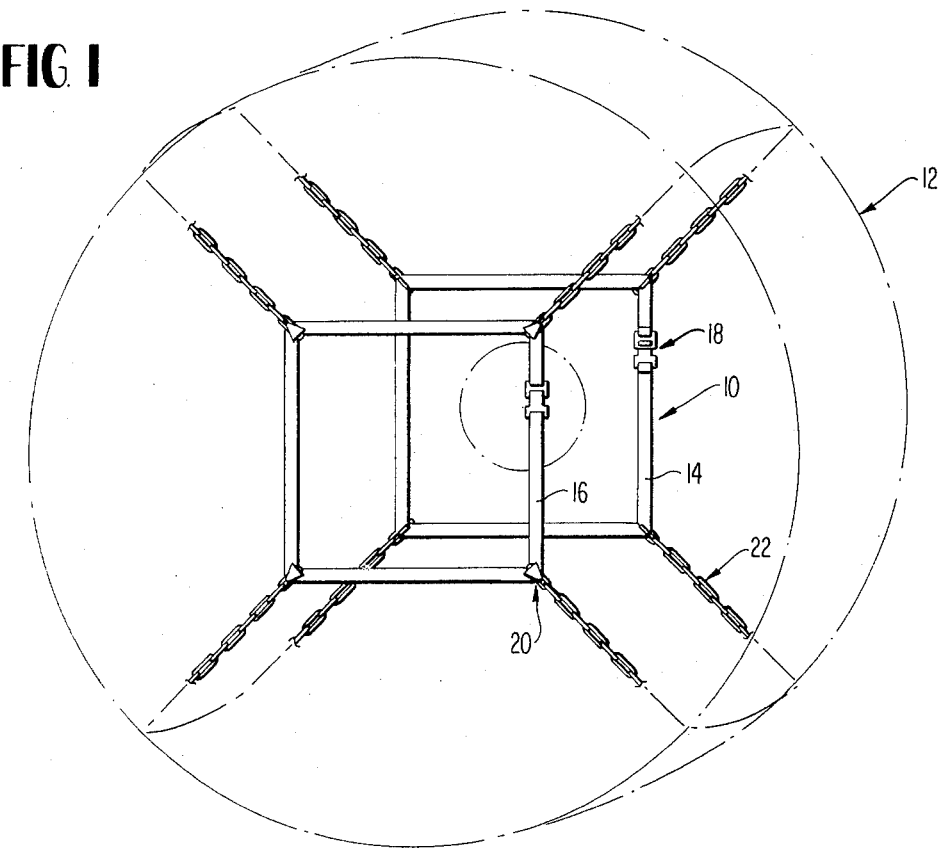
FIG. 1
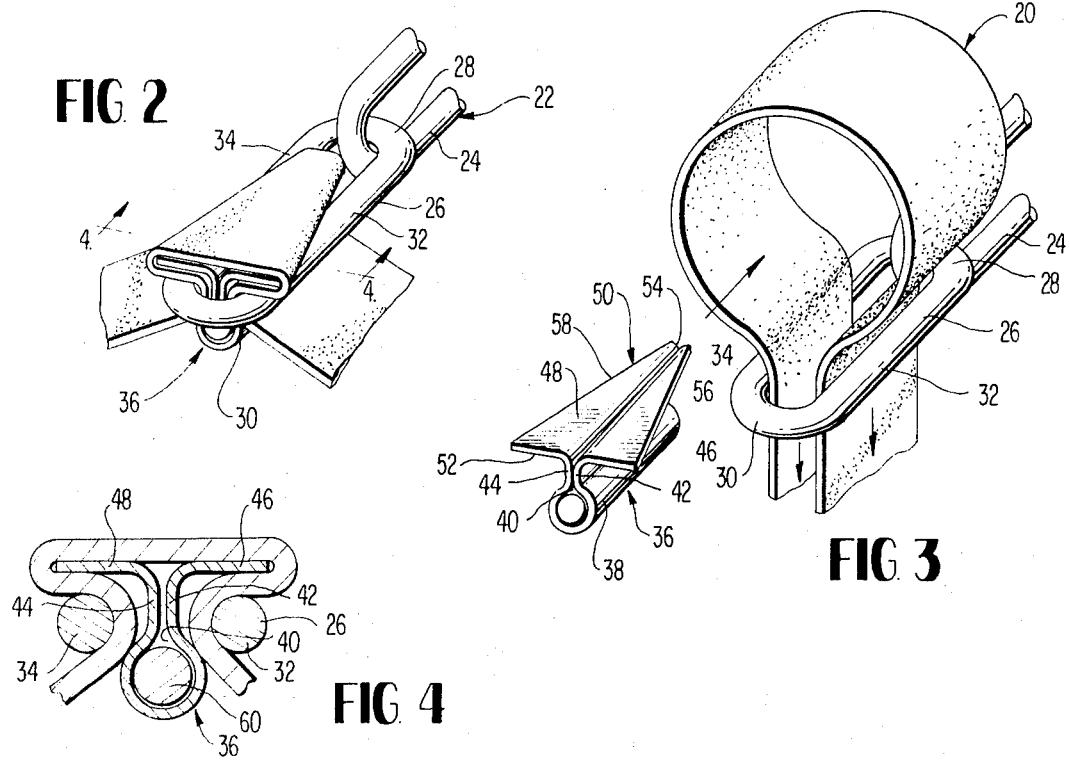
FIG. 2
FIG. 3
FIG. 4

TIRE CHAIN DEVICE

CROSS REFERENCE TO RELATED APPLICATION

This invention comprises an improvement in the subject matter of my prior application Ser. No. 408,398 filed Oct. 23, 1973.

BACKGROUND OF THE INVENTION

1. Field of the Invention

This invention pertains to traction devices for motor vehicles, particularly to a traction device for temporary attachment to the wheel for use in snow or mud conditions. The device is readily attached and removed.

2. Statement of the Prior Art

The general concept of inner and outer straps and spaced chain means is disclosed in my aforesaid prior application. Reference is also made to the earlier patents therein listed.

SUMMARY OF THE INVENTION

The present invention provides a unique tire chain device which is readily applied to or demounted from a vehicle wheel. The unit is of uncomplicated form, and is unlikely to become tangled during periods of storage. Thus, the application of the device to a wheel is expedited and simplified, even during periods of inclement weather, darkness or the like.

The arrangement includes inboard and outboard adjustable straps, a series of spaced-apart link chains, and a new and novel butterfly plug which connects the terminal link of each chain to the strap.

Another objective of the invention resides in the provision of a plug device as aforesaid which is adjustable as to position relative to the strap.

The device hereof is economical to manufacture, non-complex in assembly and durable in use.

Other and further objects and advantages of the invention will become apparent to those skilled in the art from a consideration of the following specification when read in conjunction with the annexed drawings.

BRIEF DESCRIPTION OF THE DRAWING

FIG. 1 is a perspective view of a tire chain device constructed and assembled in accordance with teachings of this invention, shown as applied to a tire/sheel combination;

FIG. 2 is an enlarged perspective view showing details of a corner connection of a strap, chain links and butterfly plug;

FIG. 3 illustrates the components of FIG. 2 in disassembled condition; and

FIG. 4 is a further enlarged cross sectional view showing details, taken on line 4—4 of FIG. 2, looking in the direction of the arrows.

DESCRIPTION OF THE PREFERRED EMBODIMENTS

The improved tire chain device hereof is generally identified in the drawing by reference chambers 10. A wheel and tire assembly 12 of a vehicle is shown by way of illustration of the environment of use of the device and the manner of application of the device thereto. The chain assembly includes inboard and outboard straps 14, 16 each of which is substantially identical whereby a description of one will suffice for each. Each strap has a changeable connector 18 such as a buckle or the like, and each is adjustable as to length. The straps are formed, as shown, into substantially square or rectangular outline, and each has a series of corner sections 20.

Interconnecting the aligned corner section of the inboard and outboard straps are link chain assemblies 22. The chain assemblies are provided at spaced locations and extend between the straps at such locations. Each of the chains includes a plurality of links 24 and two terminal end links 26. The terminal links are elongated and have curved end portions 28, 30 and linear side portions 32, 34. The remaining links are preferably similar, and the links are continuously joined.

Each chain, and each of the strap corners is the same. The butterfly plug forming an important component of the invention is generally identified in the drawing by reference numeral 36. Each of the plugs comprises an elongated tubular base 38 which is split at 40. A pair of walls 42, 44 project from the base, the base being of sufficient resiliency to permit some flexation therebetween, and the base being dimensioned to fit between the sides 32 and 34 of the terminal links. Extending laterally from the walls 42 and 44 are plates 46 and 48 which collectively form a triangular plate 50 having a base 52, an apex 54 and sides 56, 58.

The corner sections 20 of the straps are doubled upon one another in loop form as shown in FIG. 3, and extended through the terminal links. The plug 36 is then inserted in the loop with the apex pointed toward the outer circumference of the wheel, and the strap is pulled tightly about the plug. This wedges the strap about the base 38 and forces the base through the link. Continued tightening of the strap conformably fits the strap about the plug thereby forming an angular relationship between the strap and the plug, resulting both in connection of the strap to the link and plug and in the formation of a smooth corner. In order to further tighten this connection, a substantially cylindrical plug 60 is inserted in the base 38 to effect expansion thereof.

While the connection thus effected is extremely secure, adjustment of location of the corner plugs may be accomplished through the application of pressure to the walls 42 and 44 to loosen the same.

I claim:

1. In an adjustable tire chain assembly of the type having inboard and outboard straps of flexible materials and of adjustable circumference, means for forming the straps into rectilinear sections, and link chains extending between the inboard and outboard straps at spaced locations, that improvement in said means which comprises:

at least the terminal links of each link chain being elongated;

corner loop sections of the respective straps being extended through the terminal links;

a resilient butterfly plug for each terminal link to provide corner sections for said straps, the butterfly plugs each having an elongated tubular base, side wall means extending from the base, and a triangular top plate;

the butterfly plugs being positioned in said terminal links within the loop sections of the strap, with the straps formed at an angular relation by said triangular top plates on one side of the associated link, and with said tubular bases on the other side of said associated link; and means preventing the displacement of said plugs and straps from said respective links.

2. The invention of claim 1, wherein:

the tubular base is split, and the side wall means include a pair of walls extending from the split of the base;

the means preventing the displacement of the plug and strap means comprising an expansion member frictionally engaged in the base following positioning thereof relative to the strap and link.

3. The invention of claim 2, wherein:

the triangular top plate is formed in two portions secured to the respective side walls of said plug at a substantially right angular relation thereto.

4. The invention of claim 2, wherein:

the expansion member comprises a substantially cylindrical plug of a diameter exceeding the unexpanded diameter of said tubular base.

* * * * *